United States Patent [19]

Ophir et al.

[11] 4,406,153
[45] Sep. 27, 1983

[54] ULTRASONIC BEAM CHARACTERIZATION DEVICE

[75] Inventors: Jonathan Ophir; Nabil F. Maklad; Paul M. Jaeger, all of Houston, Tex.

[73] Assignee: Acoustic Standards Corporation, Houston, Tex.

[21] Appl. No.: 296,856

[22] Filed: Aug. 27, 1981

Related U.S. Application Data

[63] Continuation-in-part of Ser. No. 36,016, May 4, 1979, Pat. No. 4,286,455.

[51] Int. Cl.$^3$ ............................................. G01N 37/00
[52] U.S. Cl. .................................................... 73/1 DV
[58] Field of Search .............. 73/1 R, 1 DV; 128/660

[56] References Cited

U.S. PATENT DOCUMENTS 4,331,021 5/1982 Lopez et al. ...................... 73/1 DV

FOREIGN PATENT DOCUMENTS 2814336 5/1979 Fed. Rep. of Germany .... 73/1 DV

OTHER PUBLICATIONS

Edmonds et al.—"A Human Tissue Phantom"—Conference, Gaithersburg, Md., U.S.A. (Jun. 1977).
Sommer et al.—"A Phantom for Imaging Biological Fluids by Ultrasound & CT Scanning"—Ultrasound in Med. & Biol., vol. 6, No. 2, pp. 135–140, 1980.
American Institute of Ultrasound in Medicine Standard 100 Millimeter Test Object Including Standard Procedure for Its Use, Adopted as a Standard at the 1974 AIUM Meeting, Seattle, Washington.
First Experiences with a Solid Tissure Model for the Standardization of A– and B–Scan Instruments in Tissue Diagnois, P. Till and K. C. Ossoinig, Ultrasound in Medicine, vol. 3B, White & Brown, Eds. Plenum Publishing Co., NY, NY 10011, 1975.
Standard Phantom Object for Measurements of Gray Scale and Dynamic Range of Ultrasonic Equipment, Anant K. Nigam, C.B.S. Laboratories, Stamford, Conn., Acoustical Holography, vol. 6, N. Booth, Ed., 1975, Plenum Publishing Co., NY, NY 10111.

*Primary Examiner*—Charles A. Ruehl
*Attorney, Agent, or Firm*—Schmidt, Johnson, Hovey & Williams

[57] ABSTRACT

An ultrasound beam charcterization device is provided which may be employed during manufacture of diagnostic ultrasound equipment or during use thereof in the field in order to determine the beam profile of the ultrasonic transducer. The device includes a substantially air tight enclosure or box, having therein a thin element characterized by the properties of substantially uniform acoustic scattering and a different back scatter coefficient than the surrounding filler medium. The element is preferably oriented along or parallel to the axis of radiation of the transducer, and is advantageously in the form of a synthetic resin cellular foam material having a relatively high scattering level, which may be embedded in a different foam of lower scattering level. A reticulated cellular foam and salt solution fill the remaining volume of the preferred device, thereby permitting the imaging of transducer beam profiles in a tissue equivalent material.

15 Claims, 2 Drawing Figures

ULTRASONIC BEAM CHARACTERIZATION DEVICE

This is a continuation-in-part of application Ser. No. 36,016, filed May 4, 1979, and entitled "Ultrasound Phantom", now U.S. Pat. No. 4,286,455.

BACKGROUND OF THE INVENTION

1. Field of the Invention

The present invention is broadly concerned with ultrasound beam characterization devices and phantoms which are used to test the accuracy of and to calibrate ultrasonic diagnostic equipment presently in use by many hospitals and doctors. More particularly, it is concerned with such devices which preferably form a part of an ultrasound phantom having ultrasound characteristics (i.e., the transmission pattern of ultrasonic waves directed therethrough) closely mimicking the transmission pattern of similar ultrasonic waves directed through one or more portions of the human body. Important ultrasound characteristics such as wave velocities, and attenuation and scattering coefficients of the phantom of the invention are very similar to those of human tissue. Devices in accordance with the invention can thus be constructed for permitting accurate beam characterization in the context of a tissue equivalent material, which greatly facilitates diagnostic techniques using ultrasound devices.

2. Description of the Prior Art

Although diagnostic ultrasound equipment has been in use for a number of years, a persistent problem has plagued both the designers and users of such equipment. Specifically, a truly stable and uniform ultrasound phantom has not been available for calibrating and checking the equipment on a regular basis. Similarly, a tissue-mimicking ultrasound phantom having necessary stability and uniformity qualities has not heretofore been produced. Ideally, such a tissue-mimicking phantom should have the same ranges of uniform velocities of sound, attenuation coefficients, and scattering coefficients as human tissue, although for calibration purposes exact tissue-mimicking characteristics are not absolutely necessary.

A number of attempts have been made in the past to provide an effective ultrasound phantom. One such attempt is described in an article entitled "Tissue Mimicking Materials For Ultrasound Phantoms", by Ernest L. Madsen et al., *Med. Phys.*, 5 (5), Sept./Oct. 1978. In the phantoms described in this article, water-based pharmaceutical gels containing uniform distributions of graphite powder and known concentrations of alcohol are employed. One drawback in this type of ultrasound phantom stems from the fact that the graphite tends to settle out at temperatures over 90° F., thus irreversably altering the ultrasound properties of the phantom. Moreover, many gels employed can be unstable under certain conditions, primarily due to bacterial attacks on the gel and ambient temperature variations, thus leading to degradation of the gel and consequent failure of the phantom. Finally, it is difficult to achieve and maintain a uniform dispersion of the graphite, and to incorporate zones therein for the mimicking of cysts or the like.

Another known ultrasound phantom produced by researchers at the University of Colorado employs a base of silicone polymer combined with mineral oil, polystyrene or glass beads embedded therein. Various other substances are being investigated as phantom materials, and these include soft plastics such as plastisols, or urethane polymers. However, the phantoms produced to date are generally deficient in one or more important respects. For example, it is very difficult to remove air bubbles from the material and achieve reproducibly uniform concentrations of scattering particles.

Another problem associated with ultrasound diagnostic equipment relates to the inability to properly determine the effective transducer beam profile and focal length. Presently, such determinations are made by scanning wire targets in a liquid filled phantom such as the AIUM standard 100 mm. test object, and while this does give a beam profile and focal length, these values may be very different when the transducer actually scans human tissue. Thus, while a particular transducer may be rated with a given focal length and beam profile, actual use thereof in a diagnostic test can give very different results. In this regard it will be understood that if a given transducer is out of focus with respect to scanning a particular internal organ (e.g., a liver), the ultrasound diagnostic results are correspondingly less than optimum; therefore, a transducer having a proper focal length for scanning the organ in question should be employed if possible.

In response to this latter problem, workers in the art have bought and maintained an array of differently rated transducers, and have attempted to achieve proper focal length for a given patient or condition being scanned on essentially a trial and error basis. This is a time consuming process, wherein diagnostic success often depends heavily upon skill of the operator.

Accordingly, there is a real need in the art for an ultrasound beam characterization device which can be used to give more accurate transducer beam profiles and focal lengths, particularly in the context of a tissue-mimicking ultrasound phantom.

SUMMARY OF THE INVENTION

Broadly speaking, an ultrasonic beam characterization device in accordance with the invention includes a substantially air tight enclosure such as a Plexiglas box or the like, and means within the enclosure for profiling an ultrasonic beam directed therethrough. The latter comprises an elongated thin element formed of material having substantially uniform acoustic scattering properties, and a filler material disposed about the element. Further, the filler material and element have different back scatter coefficients.

In preferred forms, the beam characterizing or profiling element is formed of a nonmetallic synthetic resin foam material and is either rod-like or sheet-like in configuration. The element should have a maximum thickness of not more than about 2 mm. and preferably not more than about 1 mm. In fact, the element should be of the smallest thickness possible from the standpoint of desirable acoustic properties in the final device.

In particularly preferred forms, the element forms a part of an overall ultrasound phantom. Broadly speaking, the phantom includes within the air-tight enclosure filler means for altering the characteristics of ultrasonic waves directed therethrough to give desired transmission patterns. Preferably, the pattern-altering filler means is designed to be tissue-mimicking, i.e., the pattern mimics the transmission pattern of similar ultrasonic waves directed through one or more portions of the human body. The pattern-altering filler means desirably includes a quantity of a cellular foam material, and a fluid such as an aqueous liquid dispersed throughout the material.

In practice, it has been found that an open-cell reticulated foam material is particularly advantageous for the filler portion of the phantom/beam characterization device hereof. Such filler material should normally have a porosity of from about 5 to 100 pores per linear inch and be of yieldable, but substantially shape-retaining physical characteristics, along with a solution (most preferably about 0.8 Molar) of sodium chloride and water. This liquid component is characterized by the property that ultrasound waves travel therethrough at an average velocity of about 1540 meters per second. The attenuation and scattering coefficients of the overall filler (foam and liquid) closely mimic those of human tissue of all diagnostically used frequencies (1–10 Megahertz).

Zones of differing transmission pattern characteristics can be provided as desired in the filler simply by forming hollowed regions in the foam which can be either left hollow or filled with an insert, such as a foam (reticulated or otherwise) having a different bulk density and/or porosity than the surrounding foam. In this way the ultrasound characteristics of vessels, cysts, tumors and different types of tissues found in the human body can be closely mimicked.

In constructing a phantom/beam characterization device in accordance with the preferred aspects of the invention, a foam filler is cut so as to accommodate either a sheet or rod-like element formed of reticulated synthetic resin foam or other appropriate material having the desirable back scatter coefficient different than that of the surrounding foam. The foam filler and element are then placed within a box or other enclosure, and the latter is filled with a salt solution.

DESCRIPTION OF THE PREFERRED EMBODIMENT

Figure 1:
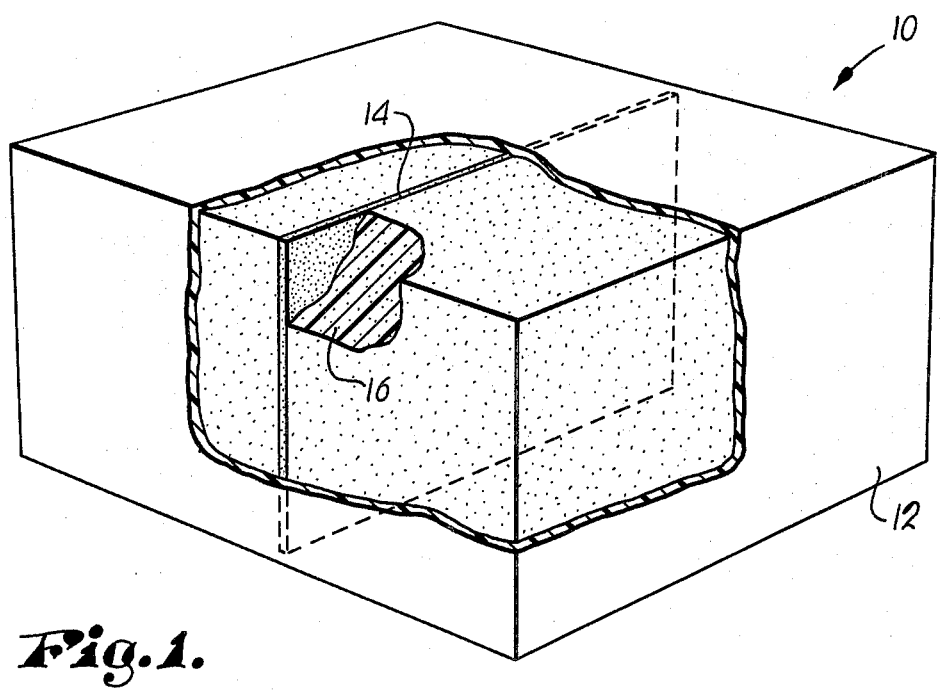
FIG. 1 is an essentially schematic, perspective view with parts broken away for clarity of a tissue-mimicking ultrasound phantom/beam characterization device in accordance with the invention, with a thin sheet-like element within the phantom filler for determining beam profile and focal length.

A beam characterization device forming a part of a tissue-mimicking ultrasound phantom can be produced in the following manner.

First, a rectangular box formed of $\frac{3}{8}$ inch thick Plexiglas with a removable, gasketed lid is provided, the latter having a small depression therein for receiving an acoustic couplant such as mineral oil. A rectangular section of reticulated open-cell synthetic filler foam is cut from a large bun thereof to snuggly fit within the Plexiglas box. The foam is commercially available from the Foam Division, Scott Paper Company, Chester, Pennsylvania, and has a porosity of from about 50–100 pores per linear inch (p.p.i.). This material is a reticulated open-cell polyurethane foam of dodecahedral network or lattice configuration.

The foam filler section is then modified by cutting it into two portions of substantially equal volume, removing a thin section of foam at the juncture of the portions, and inserting therebetween a thin (1 mm.) sheet of relatively higher scattering reticulated synthetic resin foam material, which serves as the beam characterization element. This foam should preferably have a porosity of about 30 p.p.i., although other porosities can be employed.

The filler material and element are next rinsed thoroughly with hot water and placed within the Plexiglas box with the sheet being disposed centrally between the foam portions. The box is then placed in a vacuum chamber (with the top removed) and the chamber is evacuated, using an aspirator pump. A separate line to the vacuum chamber is used to deliver boiling water to the bottom of the chamber, and this is continued until the water level is at least one or two inches above the upper margin of the box. After the water has cooled to room temperature, the pressure within the chamber is equalized with ambient, and the top of the vacuum chamber is removed.

In order that the liquid within the chamber is characterized by the property that ultrasound waves travel therethrough at an average speed about equal to the velocity of similar waves through human tissue (approximately 1540 meters per second), 45 grams per liter of sodium chloride is added to the box to create a 0.8 Molar solution of salt water therein.

Salt addition is accomplished by mixing 160 grams of sodium chloride and about 1 liter of water, followed by boiling for several minutes to remove air bubbles. This solution is carefully siphoned into the box. Inasmuch as the salt solution has a density of about 1.1 gr/ml, it sinks to the bottom of the box and displaces the fresh water. The penultimate step involves adding about 1 milliliter of an effective biocide (e.g., "Bath-Kleer" sold by Instrumentation Laboratory, Lexington, Mass.) per liter of solution, in order to eliminate bacterial growth within the phantom. The top of the box is then attached underwater to completely seal the box. At this point the completed device may be removed from the vacuum chamber and is ready for use.

Devices in accordance with the invention are extremely stable over time and do not significantly change in terms of ultrasound velocity, attenuation and scattering characteristics. Moreover, the temperature stability thereof allows the devices to be easily stored and used without special precautions. In the case of devices produced using the Scott reticulated foam filler, an attenuation coefficient of about 1.85 dB/cm (at 3.5 MHZ) for the phantom portion was measured. The speed of ultrasonic waves through the phantom portion was about 1540 meters per second.

The attenuation coefficient of the phantom filler portion obeys a power law behavior, i.e., the attenuation coefficient equals $Kf^x$, when f is frequency and K and x are constants. The value of x ranges from about 1 to 1.5. This is a fair approximation of the attenuation coefficient of human tissue. The temperature dependence of the attenuation coefficient was found to be about minus 0.05 dB/cm/°C. at 3.5 Megahertz; the temperature dependence of velocity was about 3.0 meters/second/°C. The dynamic range of scattered echoes was about 25 to 35 dB.

A number of distinct advantages are inherent in phantom/beam characterization devices in accordance with the invention. For example, the essential uniformity of the synthetic resin foam filler portions and the beam characterization element allow production of a device which can be dependably used as a calibrated test object, so that diagnostic ultrasound equipment can be checked on a day-to-day basis. This fact also eliminates the need for critical dispersion of scattering objects throughout the phantom. Furthermore, the use of a fluid in the phantom (as opposed to a gel, for example) allows void-free filling of the foam and surrounding container, to thus eliminate the presence of air bubbles which are extremely detrimental in devices of this type. The most important ultrasound characteristics of the phantom portion, i.e., speed of sound therethrough, attenuation coefficient and scattering can also be independently altered. That is to say, speed of sound can be changed by, for example, changing the fluid or concentration of components therein; the attenuation coefficient can be modified by employing a different foam filler having an altered bulk density; and scattering can be changed by choosing a foam filler having a different porosity. In like manner, the acoustic characteristics of the beam characterizing element can also be changed at will by using a reticulated foam of higher or lower porosity by employing a vitrified cellular material having altered properties, or by using an element formed of a different material altogether. Thus, ultrasound devices can be produced having desired ultrasound characteristics without sacrifice of uniformity or longevity. Of course a wide variety of other objects such as rubber ultrasonic absorbers or wire reflectors can be located within the phantom at the discretion of the user. Finally, the shape-retaining nature of the preferred foam filler material allows formation of wall-less hollowed regions therein for cyst-mimicking (which is difficult with gels) and also permits incorporation of motion-creating apparatus for alternately compressing the foam filler and then allowing the foam filler to expand and return to its original configuration.

Although the preferred device discussed above provides a beam characterizing element in conjunction with a foam/liquid tissue-mimicking phantom filler, the invention is not so limited. Indeed, the beam characterizing element may be used with other types of tissue-mimicking materials (e.g., gels) or for that matter in aqueous media such as water or virtually any other filler. Thus, in broader aspects, a device 10 (see FIG. 1) need only include an air-tight enclosure 12 having therewithin a thin element 14 formed of material having substantially uniform acoustic scattering properties, and a filler material 16 such as the reticulated cellular foam material. In the illustrated device, a transducer would be laterally scanned across the thickness of element 14 to give the desired results.

Figure 2:
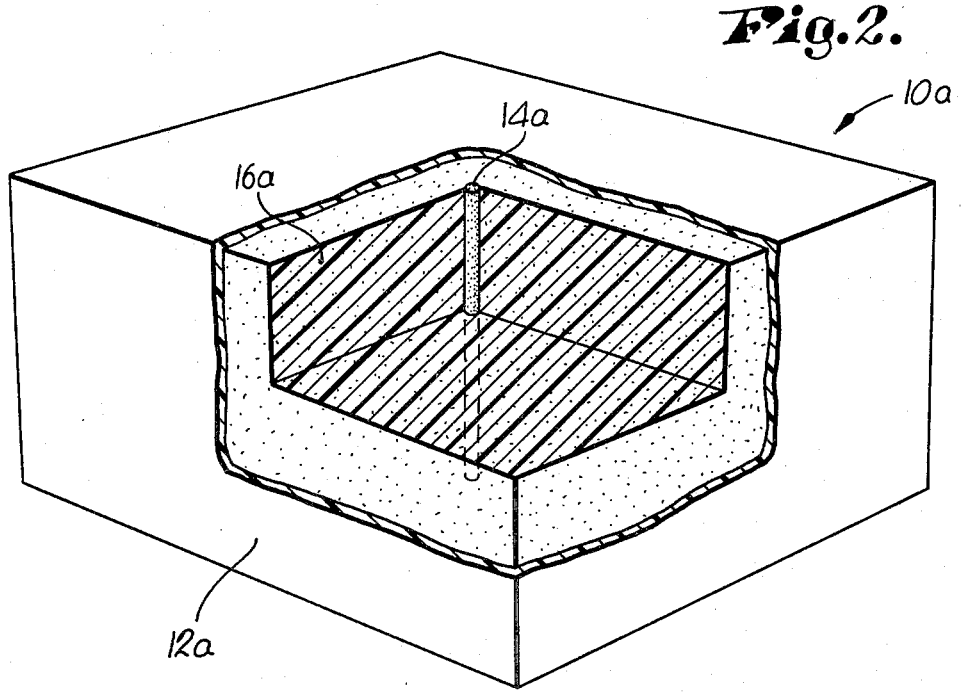
FIG. 2 is a view similar to that of FIG. 1, with the phantom including a thin, rod-like beam-characterizing element therewithin.

In FIG. 1 a sheet-like element 14 has been depicted. However, other configurations are within the ambit of the invention. For example, in FIG. 2 a device 10a is illustrated which is identical with device 10 except that the element 14a is in rod-like form. In order to install such a rod-like element, the foam 16a is merely centrally bored and the element 14a inserted therein.

It will be appreciated that the beam characterizing elements of the invention, having substantially uniform acoustic scattering properties, are fundamentally different than prior reflective phantom inserts such as metallic or solid synthetic resin wires. The latter are effective acoustic reflectors and give problems such as acoustic shadowing and reverberation and are therefore objectionable. In contrast, the preferred elements hereof, by virtue of a large number of discrete acoustic scattering sites throughout the physical structure thereof, avoid these problems and permit excellent beam characterization.

We claim:

1. An ultrasonic beam characterization device for characterizing an ultrasonic beam directed along an axis of radiation, said device comprising:
   a substantially air-tight enclosure; and
   means within said enclosure for profiling and imaging said ultrasonic beam when the latter is directed therethrough,
   said means comprising an elongated, thin element formed of material having substantially uniform acoustic scattering properties with a plurality of acoustic scattering sites throughout the physical structure thereof, said element being oriented substantially along or parallel to said axis of radiation, and a filler material disposed about said element, said element having a different back scatter coefficient than said filler material.

2. The device as set forth in claim 1, said element being nonmetallic.

3. The device as set forth in claim 2, said element being in the form of a synthetic resin foam material.

4. The device as set forth in claim 3, said material being vitrified.

5. The device as set forth in claim 1, said element being rod-like in configuration.

6. The device as set forth in claim 1, said element being in the form of a sheet.

7. The device as set forth in claim 1, said element having a maximum thickness of no more than 2 millimeters.

8. The device as set forth in claim 1, said filler material comprising a first cellular foam material, and a fluid dispersed throughout said first foam material.

9. The device as set forth in claim 8, said element being formed of a second cellular foam material, the porosities of said first and second materials being different.

10. The device as set forth in claim 8, said fluid comprising a solution of sodium chloride in water.

11. The device as set forth in claim 1, said filler material comprising aqueous media.

12. An ultrasonic beam characterization device, comprising:
    a substantially air-tight enclosure; and
    means within said enclosure for profiling and imaging an ultrasonic beam directed therethrough,
    said means comprising an elongated, thin element formed of synthetic resin foam material having substantially uniform acoustic scattering properties, and a filler material disposed about said element, said element having a different back scatter coefficient than said filler material.

13. The device as set forth in claim 12, said element having a maximum thickness of no more than 2 millimeters.

14. An ultrasonic beam characterization device, comprising:
    a substantially air-tight enclosure; and
    means within said enclosure for profiling and imaging an ultrasonic beam directed therethrough,
    said means comprising an elongated, thin element formed of material having substantially uniform acoustic scattering properties, and a filler material disposed about said element, said element having a different back scatter coefficient than said filler material,
    said filler material comprising a cellular foam material and a fluid dispersed throughout said first foam material.

15. The device as set forth in claim 14, said element having a maximum thickness of no more than 2 millimeters.

* * * * *